United States Patent
Uejyukkoku et al.

[11] Patent Number: 6,143,804
[45] Date of Patent: Nov. 7, 2000

[54] CURABLE AND FOAMABLE POLYOLEFINIC RESIN COMPOSITION, CURED FOAM OF POLYOLEFINIC RESIN AND METHOD FOR PRODUCING IT

[75] Inventors: Nario Uejyukkoku, Gamou; Motoi Naito, Ktoto; Fusayoshi Akimaru; Akihiro Kataoka, both of Ootsu; Masakazu Kanazawa, Kumamoto, all of Japan

[73] Assignee: Toray Industries, Inc., Japan

[21] Appl. No.: 09/348,932

[22] Filed: Jul. 7, 1999

[30] Foreign Application Priority Data

Jul. 13, 1998 [JP] Japan ................................ 10-196862

[51] Int. Cl.⁷ ........................................................ C08J 9/00
[52] U.S. Cl. ................................ 522/78; 521/79; 521/140; 521/142; 521/143; 521/150
[58] Field of Search ............................... 522/78; 521/140, 521/143, 142, 150, 79

[56] References Cited

U.S. PATENT DOCUMENTS

| | | | |
|---|---|---|---|
| 3,651,183 | 3/1972 | Hosoda et al. | 521/150 |
| 3,714,083 | 1/1973 | Nakayama et al. | 521/140 |
| 3,852,177 | 12/1974 | Atchison et al. | 521/150 |
| 4,499,210 | 2/1985 | Senuma et al. | 521/81 |
| 5,304,580 | 4/1994 | Shibayama et al. | 521/150 |
| 5,786,406 | 7/1998 | Uejyukkoku et al. | 521/150 |

FOREIGN PATENT DOCUMENTS

| | | |
|---|---|---|
| 0 132 931 A2 | 2/1985 | European Pat. Off. . |
| 06 096 625 | 4/1994 | European Pat. Off. . |
| 07 169 099 | 7/1995 | European Pat. Off. . |

*Primary Examiner*—Morton Foelak
*Attorney, Agent, or Firm*—Austin R. Miller

[57] ABSTRACT

A polyolefinic resin is combined with a (meth)acrylic polyfunctional monomer compound having an aromatic ring, an alicyclic ring or a heterocyclic ring nearly in the center of its chemical formula, and a pyrolyzable chemical foaming agent to give a curable and foamable polyolefinic resin composition. The composition is shaped into a sheet, then cured and foamed into a sheet foam. The cured foam of polyolefinic resin has a curing degree of from 10 to 70%, and has the advantages of good heat resistance, good workability and shapability, and good pressure resistance.

21 Claims, No Drawings

CURABLE AND FOAMABLE POLYOLEFINIC RESIN COMPOSITION, CURED FOAM OF POLYOLEFINIC RESIN AND METHOD FOR PRODUCING IT

BACKGROUND OF THE INVENTION

1. Field of the Invention

The present invention relates to a curable and foamable polyolefinic resin composition, a cured foam of polyolefinic resin to be formed from the composition, and a method for producing the cured foam.

More precisely, the invention relates to a cured foam of polyolefinic resin which has the advantages of high heat resistance, good workability into complicated articles, good workable characteristics at high temperatures, high pressure resistance at high temperatures, and well-controllable flexibility, and which can therefore be subjected to broad secondary working to give various articles of many applications, and also relates to a curable and foamable polyolefinic resin composition which is favorably and continuously formed into the cured foam.

2. Description of the Related Art

Cured foams of resin consisting essentially of polypropylenic resin and those consisting essentially of polyethylenic resin have many applications in various fields, as having the advantages of good workability, good buffering ability, good heat insulation, and high heat resistance. For example, polypropylenic resin foams are laminated with a skin layer of, for example, polyvinyl chloride sheets, olefinic (elastomeric) resin sheets (TPO sheets) or woven or knitted fabrics, and worked in various working methods into upholstery for cars, such as door parts, instrument panels, console boxes, sheet-back garnishes, etc.

Those cured foams of polyolefinic resin are produced in a process comprising molding a resin composition that contains a curing agent and a chemical foaming agent, curing it and then foaming it. One curing method for the process comprises exposing a continuous sheet of a foamable resin composition to ionizing radiations. Low-density polyethylenic resin as prepared in a high-pressure method is easily curable with radiations, and the radiation curing method is extremely favorable to resin compositions comprising it. However, when polypropylenic resin is exposed to radiations, its molecular chains break easily, and the polypropylenic resin cured with radiations is often degraded. Therefore, in general, it is difficult to cure polypropylenic resin with radiations to such a degree that the cured resin is favorably foamed.

Therefore, where polypropylenic resin is formed into foams in a process comprising curing it with radiations, it must be specifically modified so as to be well applicable to the process of curing and foaming it. For example, as in JP-B 46-38716, JP-A 61-69844 and JP-A 5-78514, a polyfunctional monomer compound having a reactive vinyl group, acrylic group or methacrylic group in the molecular structure and serving as a curing agent is added to polypropylenic resin, then the resulting resin composition is exposed to radiations while the radiation energy is well controlled to such a degree that the radiations applied to the resin do not degrade the cured resin, and thereafter the cured resin is foamed under heat into foams.

However, curable and foamable resin compositions that contain the conventional polyfunctional monomer compound serving as a curing agent therein are problematic in that the polyfunctional monomer compound disperses poorly in the compositions and is often localized therein, though depending on the type of the polyfunctional monomer compound used therein and on the constitution of the resin therein. As a result, the resin compositions are cured unevenly. When foamed, the unevenly cured compositions are unstable. In addition, the pores in the resulting resin foams are not uniform in size. The resin foams having such non-uniform pores therein are often defective in their mechanical properties, workability and heat resistance.

On the other hand, when resin sheets are cured with electron beams, the electron beam energy applied thereto shall have a depth-dose-pattern distribution. In that case where the resin sheets contain a conventional polyfunctional monomer compound of which the reactivity is proportional to the radiation energy applied thereto and where they are cured with electron beams, the cured resin sheets shall inevitably have a curing degree distribution in their thickness direction. As a result, the foams from them shall also have a pore size distribution in their thickness direction, correspondingly to the curing degree distribution of the unfoamed sheets. In addition, the other general properties of the foams will also vary in the direction of the thickness of each foam. Owing to these problems, improving the quality of the foams is often difficult.

With the recent development in the techniques of working them, resin foams are much desired to have higher heat resistance and higher pressure resistance. In addition, they are also desired to have high flexibility, though contrary to the heat resistance and pressure resistance. In order to obtain resin foams that satisfy all these requirements, the basic resin compositions for them must be improved. In fact, however, it is difficult to obtain resin foams that satisfy all such requirements for all their applications. In practice, therefore, resin compositions for foams are optimized, depending on the necessary properties of foams as targeted to specific applications. However, the method is disadvantageous to industrial resin foam production, since the number of product types increases and the productivity of such different types of products is low and since the products require much complicated process control and quality control.

On the other hand, aliphatic (meth)acrylate-type polyfunctional monomers may be used as curing agents in producing cured resin foams, but are not so good as having various drawbacks. Concretely, they irritate the skin (PII) and are toxic when taken orally, and therefore they are defective in sanitary safety. In addition, they are hydrolyzable and are therefore poorly waterproof. Owing to such their drawbacks, the monomers require some safety measures when used in industrial resin foam production. Moreover, as their waterproofness is poor, the resin structures as cured with the monomers are often unstable in the subsequent foaming step. For these reasons, the monomers of that type are difficult to use for industrial purposes. In addition, the heat resistance of the resin foams are produced with the monomers is poor.

For polyethylenic resins having a linear structure, ordinary, vinylic functional group-having curing agents such as divinylbenzene are unfavorable, as it is difficult to control the curing degree of the resins with those agents. Concretely, the problems with the curing agents are that the mechanical properties of the resin foams produced with them are often unstable, depending on the type of the functional group in the promoters and on the structure of the promoters themselves, and that the resin foams could not exhibit the designed characteristics. For these reasons, industrial production of foams of such linear polyethylenic resins with the curing agents is not easy.

On the other hand, known is a different method of directly foaming a polyolefinic resin composition that contains an acrylic polyfunctional monomer and a foaming agent, in which the composition is not cured prior to the foaming step. In that method, however, the curing degree of the resin composition is low and practicable resin foams could not be obtained.

SUMMARY OF THE INVENTION

The object of the present invention is to provide polyolefinic resin foams, of which the advantages are that the curing degree distribution in their thickness direction is significantly reduced, that their characteristics of heat resistance, workability and pressure resistance are greatly improved without interfering with other good characteristics intrinsic to them, that their productivity is high, and that they ensure sanitary safety in the process of producing them.

We, the present inventors have found that specific polyfunctional monomer compounds which have not been used in the art of producing cured resin foams are extremely effective as curing agents for curable and foamable polyolefinic resin compositions, as their radiation energy dependency in curing reaction is extremely small, or that is, their reactivity is hardly influenced by the radiation energy intensity distribution of ionizing radiations or ultraviolet rays to which resin compositions to be cured are exposed, and as their reactivity to low energy of electron beams, their sanitary safety, their physical properties at high temperatures and their hydrolysis resistance are all good. The invention is based on these findings.

Specifically, the invention provides a curable and foamable polyolefinic resin composition that comprises a polyolefinic resin, a (meth)acrylic polyfunctional monomer compound having an aromatic ring, an alicyclic ring or a heterocyclic ring nearly in the center of its chemical formula, and a pyrolyzable chemical foaming agent. In the composition, the (meth)acrylic polyfunctional monomer compound is typically a di(meth)acrylate compound of the following general formula (I):

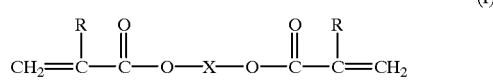

(I)

wherein X represents an organic group having an aromatic ring, an alicyclic ring or a heterocyclic ring nearly in its center; R represents H or $C_mH_{(2m+1)}$; and m falls between 1 and 3.

In place of the (meth)acrylic polyfunctional monomer compound, the composition may contain a dipropenyl compound of the following formula (VIII):

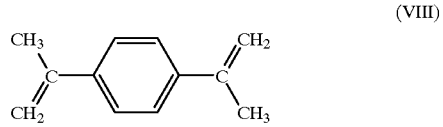

(VIII)

The invention also provides cured foams of polyolefinic resin, which are produced by shaping the curable and foamable polyolefinic resin composition into sheets, followed by curing and foaming the resulting resin sheets, and which have a curing degree of from 10 to 70%. Typically, the cured foams are produced by melting and shaping the curable and foamable polyolefinic resin composition into sheets, then curing the sheets with ionizing radiations and/or ultraviolet rays to which they are exposed, and thereafter heating and foaming the thus-cured sheets under ordinary pressure.

DESCRIPTION OF THE PREFERRED EMBODIMENTS

The terminology "curable and foamable resin composition" as referred to herein is so meant that "the resin composition is cured through curing treatment and then foamed through foaming treatment into resin foams". Therefore, the polyolefinic resin composition of the invention is cured and then foamed into foams, or that is, the composition is only for resin foams and does not have any other applications except foams.

Concretely, the polyolefinic resin for use in the invention is typified by polypropylenic resin, polyethylenic resin, or a mixture of polypropylenic resin and polyethylenic resin, and its constitution is not specifically defined provided that the resin is usable for cured resin foams.

For example, the polypropylene-based resin composition for foams of the invention preferably comprises from 30 to 90% by weight of (A) polypropylenic resin having a melt flow rate (MFR) of from 0.5 to 5 g/10 min, and from 10 to 70% by weight of (B) polyethylenic resin having a melt flow rate (MFR) of from 1 to 20 g/10 min, and this may optionally contain any other polyolefinic resin without interfering with the desired characteristics of the foams from the composition.

The polypropylenic resin (A) has MFR of from 0.5 to 5 g/10 min, and may be prepared by polymerizing a major monomer of propylene in a vapor-phase method, a slurry method, a solution method or the like generally using a Ziegler catalyst, a metallocene catalyst or a heterogeneous catalyst. More preferably, it is a copolymer as prepared by copolymerizing propylene with from 2 to 15% by weight of ethylene or an α-olefin having from 4 to 12 carbon atoms, and has a melting point falling between 125 and 155° C. As the comonomer of ethylene or an α-olefin having from 4 to 12 carbon atoms, preferred are those having a larger number of carbon atoms. This is because copolymers with the comonomer of that type give foams having higher mechanical strength and higher heat resistance.

The amount of the comonomer of ethylene or an α-olefin having from 4 to 12 carbon atoms to be copolymerized with propylene preferably falls between 2 and 15% by weight, more preferably between 3 and 8% by weight relative to the total weight of propylene. When the amount of the comonomer is smaller than 2% by weight, the resin to be formed could have a higher degree of crystallinity and therefore its foams could have high heat resistance and high mechanical strength. However, the resin having such a high degree of crystallinity is unfavorable, since it is rigid and its foams will have poor buffering ability and poor impact resistance at low temperatures. In addition, if the amount of the comonomer is smaller than 2% by weight, it is difficult to control the curing degree of the resin being cured through exposure to ionizing radiations even if a large amount of the reactive monomer is added to the resin, and it is therefore difficult to make the cured resin have a desired curing degree. For these reasons, using a smaller amount of the comonomer below 2% by weight is unfavorable. On the other hand, when the amount of the comonomer is larger than 15% by weight, controlling the curing degree of the resin will be easy and the resin foams could have good flexibility. However, the melting point of the resin having such a large amount of the comonomer component is low, thereby unfavorably resulting in that the resin foams have poor heat resistance and poor pressure resistance at high temperatures.

The melting point of the polypropylenic resin (A) preferably falls between 125 and 155° C., more preferably between 130 and 145° C. If its melting point is lower than 125° C., the resin (A) will be defective in heat resistance, and, as a result, the applications of the resin foams will be unfavorably limited. On the other hand, if its melting point is higher than 155° C., the resin (A) could have good heat resistance, and the resin foams will have many applications. If so, however, the resin composition will generate high shear heat in the extrusion step of shaping it into sheets to be foamed, and, as a result, the foaming agent in the composition will be unfavorably decomposed by the heat.

MFR of the polypropylenic resin (A) falls between 0.5 and 5 g/10 min, but preferably between 1 and 3 g/10 min. If MFR of the resin is smaller than 0.5 g/10 min, the foaming agent in the resin composition will be decomposed by the shear heat of the resin, and, unfavorably, the pores in the resin foams will be not uniform in size. On the other hand, if MFR of the resin is larger than 5 g/10 min, the melt viscosity thereof will below. With the resin having such a large MFR, the foaming agent will not be decomposed and the resin foams could have uniform pores. However, when the resin composition is shaped into sheets, it will require a special cooling device so as to be shaped into smooth sheets. In addition, the resin having such a large MFR is further unfavorable in that the resin foams could not be well elongated, that they could not well maintain their original morphology when worked under heat, and that they will have poor pressure resistance at high temperatures. After all, the resin foams could not be worked into good articles.

The polyethylenic resin (B) has MFR of from 1 to 20 g/10 min, and may be prepared by polymerizing a major monomer of ethylene in a vapor-phase method, a slurry method, a solution method or the like generally using a Ziegler catalyst, a metallocene catalyst or a heterogeneous catalyst. More preferably, it is a copolymer as prepared by copolymerizing ethylene with from 2 to 15% by weight of an α-olefin having from 4 to 12 carbon atoms, and has a density falling between 0.880 and 0.940 g/cm$^3$. The comonomer to be copolymerized with ethylene is an α-olefin having from 4 to 12 carbon atoms. More preferably, the comonomer is an α-olefin having from 4 to 8 carbon atoms, in view of the physical properties of the foams from the resin composition.

The density of the resin (B) falls preferably between 0.880 and 0.940 g/cm$^3$, more preferably between 0.890 and 0.935 g/cm$^3$. If the resin has a density of smaller than 0.880 g/cm$^3$, its foams could have good flexibility. However, the resin having such a small density is unfavorable, since its melting point is low and therefore the heat resistance of its foams is poor. In addition, since the resin is extremely sticky, it could not be uniformly mixed with the foaming agent and the resin foams will be often blocked. On the other hand, if the resin has a density of larger than 0.940 g/cm$^3$, the resin foams could have high mechanical strength and high heat resistance, but the degree of crystallinity of the resin is high. The resin having such a high degree of crystallinity is unfavorable, since it is rigid and its foams will have poor buffering ability.

MFR of the resin (B) falls between 1 and 20 g/10 min, but preferably between 3 and 10 g/10 min. If its MFR is smaller than 1 g/10 min, the resin is unfavorable as having an increased melt viscosity. With the resin having such a high melt viscosity, the foaming agent in the resin composition will be decomposed by the shear heat of the resin being shaped into sheets, and the pores in the resin foams will be unfavorably coarse and large. On the other hand, if MFR of the resin is larger than 20 g/10 min, the melt viscosity thereof will be low. With the resin having such a large MFR, the foaming agent will not be decomposed and the resin foams could have small pores. However, when the resin composition is shaped into sheets, it will require a special cooling device so as to be shaped into smooth sheets. In addition, the resin having such a large MFR is further unfavorable in that the resin foams could not be well elongated, and that they could not well maintain their original morphology when worked under heat. After all, the resin foams could not be worked into good articles.

The curable and foamable polyolefinic resin composition noted above preferably comprises from 30 to 90% by weight of the polypropylenic resin (A) and from 10 to 70% by weight of the polyethylenic resin (B). If the proportion of the polypropylenic resin (A) is smaller than 30% by weight and the proportion of the polyethylenic resin (B) is larger than 70% by weight, the resin foams could have good flexibility, good buffering ability and good shapability, but their heat resistance is unfavorably low. On the other hand, if the proportion of the polypropylenic resin (A) is larger than 90% by weight and the proportion of the polyethylenic resin (B) is smaller than 10% by weight, the resin foams are unfavorable as they are rigid and have poor buffering ability and as their shapability under heat is poor.

The polyethylene-based resin composition for foams of the invention preferably comprises (C) an ultra-low-density polyethylenic copolymer resin as copolymerized with a $C_{3-12}$ α-olefin and having a density of from 0.880 to 0.910 g/cm$^3$ and a melt flow rate (MFR) of from 0.5 to 15 g/10 min, or (D) a linear low-density polyethylenic resin having a density of from 0.915 to 0.935 g/cm$^3$ and a melt flow rate (MFR) of from 1 to 20 g/10 min, or comprises a mixed polyethylenic resin of the ultra-low-density polyethylenic copolymer resin (C) and the linear low-density polyethylenic resin (D), and this may optionally contain any other polyolefinic resin without interfering with the desired characteristics of the foams from the composition.

The ultra-low-density polyethylenic copolymer resin (C) has a density of from 0.880 to 0.910 g/cm$^3$ and MFR of from 0.5 to 15 g/10 min, and may be prepared by copolymerizing ethylene with an α-olefin having from 3 to 2 carbon atoms in a vapor-phase method, a slurry method, a solution method or the like generally using a Ziegler catalyst, a metallocene catalyst or a heterogeneous catalyst. More preferably, it has a melting point falling between 115 and 125° C. As the comonomer of an α-olefin having from 4 to 12 carbon atoms, preferred are those having a larger number of carbon atoms. This is because copolymers with the comonomer of that type give foams having higher mechanical strength and higher heat resistance.

The ultra-low-density polyethylenic copolymer resin (C) generally falls within the category of so-called linear ultra-low-density polyethylene. If its density is smaller than 0.880 g/cm$^3$, the foams from it could have good flexibility. However, the resin having such a small density is unfavorable, since its melting point is low and therefore the heat resistance of its foams is poor. In addition, since the resin is extremely sticky, it could not be uniformly mixed with the foaming agent and the resin foams will be often blocked. On the other hand, if the resin has a density of larger than 0.910 g/cm$^3$, the resin foams could have high mechanical strength and high heat resistance like ordinary linear low-density polyethylene foams, but the degree of crystallinity of the resin is high. The resin having such a high degree of crystallinity is unfavorable, since it is rigid and its foams will have poor buffering ability. The resin (C) has MFR falling between 0.5 and 15 g/10 min, but preferably between 3 and 10 g/10 min. If MFR of the resin is smaller than 0.5 g/10 min, the melt viscosity thereof will be high. The resin having such a small MFR and therefore having such a high melt viscosity is unfavorable, since the foaming agent in the resin composition will be decomposed by the shear heat of the resin being shaped into sheets, and, as a result, the resin foams will have coarse and large pores. On the other hand, if MFR of the resin is larger than 15 g/10 min, the melt viscosity thereof will be low. With the resin having such a large MFR, the foaming agent will not be decomposed and the resin foams could have small pores. However, the resin composition could not be shaped into smooth sheets if a special cooling device is not used in the sheeting step. In addition, the resin having such a large MFR is further unfavorable in that the resin foams could not be well elongated, and that they could not well maintain their original morphology when worked under heat. After all, the resin foams could not be worked into good articles.

The melting point of the resin (C) falls between 115 and 125° C., but preferably between 117 and 123° C. If its melting point is lower than 115° C., the resin (C) will be defective in heat resistance. On the other hand, if its melting point is higher than 125° C., the resin (C) could have good heat resistance, and the resin foams will have many applications. If so, however, the resin composition will generate high shear heat in the extrusion step of shaping it into sheets to be foamed, and, as a result, the foaming agent in the composition will be unfavorably decomposed by the heat. The melting point of resin is nearly correlated with the density thereof. Of the resins for use in the invention, the two are not always correlated with each other, depending on the polymerization catalyst used, the type of the reactants, and also the type of the α-olefins copolymerized. Preferably, therefore, resins having good flexibility and having a higher melting point are selected for use in the invention.

The linear low-density polyethylenic resin (D) has a density of from 0.915 to 0.935 g/cm³ and MFR of from 1 to 20 g/10 min, and may be prepared by (copolymerizing ethylene optionally with an α-olefin having from 4 to 12 carbon atoms, in the presence of a Ziegler catalyst, a metallocene catalyst or the like. The comonomer optionally copolymerized with ethylene is selected from α-olefins having from 4 to 12 carbon atoms. Preferred are α-olefins having from 4 to 8 carbon atoms, in view of the physical properties of the foams from the resin composition. The density of the resin (D) falls between 0.915 and 0.935 g/cm³, but preferably between 0.920 and 0.930 g/cm³. If the resin has a density of smaller than 0.915 g/cm³, its foams could have good flexibility. However, the resin having such a small density is unfavorable, since the resin foams have poor mechanical strength and poor heat resistance.

MFR of the resin (D) falls between 1 and 20 g/10 min, but preferably between 3 and 10 g/10 min. If its MFR is smaller than 1 g/10 min, the resin is unfavorable as having an increased melt viscosity. With the resin having such a high melt viscosity, the foaming agent in the resin composition will be decomposed by the shear heat of the resin being shaped into sheets, and the pores in the resin foams will be unfavorably coarse and large. On the other hand, if MFR of the resin is larger than 20 g/10 min, the melt viscosity thereof will be low. With the resin having such a large MFR, the foaming agent will not be decomposed and the resin foams could have small pores. However, the resin composition could not be shaped into smooth sheets if a special cooling device is not used in the sheeting step. In addition, the resin having such a large MFR is further unfavorable in that the resin foams could not be well elongated, and that they could not well maintain their original morphology when worked under heat. After all, the resin foams could not be worked into good articles.

The ultra-low-density polyethylenic copolymer resin (C) and the linear polyethylenic resin (D) may be blended in any desired ratio falling between 0/100 and 100/0, and the proportions of the two may be suitably selected, depending on the necessary characteristics, such as the intended heat resistance and the flexibility of the resin foams.

The polyfunctional monomer compound which serves as a curing agent and is combined with the polyolefinic resin in the invention is necessarily a (meth)acrylic polyfunctional monomer compound having an aromatic ring, an alicyclic ring or a heterocyclic ring nearly in the center of its chemical formula, preferably a di(meth)acrylate compound of the following general formula (I), or a dipropenyl compound of the following formula (VIII).

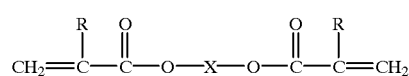
(I)

wherein X represents an organic group having an aromatic ring, an alicyclic ring or a heterocyclic ring nearly in its center; R represents H or $C_mH_{(2m+1)}$; and m falls between 1 and 3.

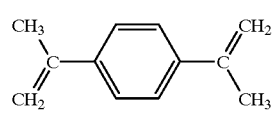
(VIII)

In formula (I) representing di(meth)acrylate compounds, R is H or $C_mH_{(2m+1)}$ with m falling between 1 and 3, but is preferably $CH_3$ in view of the reactivity and the sanitary safety of the compounds. With longer side chains R's, the compounds are safer but their reactivity to electron beams is poorer, and therefore, it is difficult to broaden the curing degree of the resins cured with the compounds. For these reasons, the compounds of formula (I) having alkyl groups with m larger than 3 are unfavorable.

In formula (I), X is an organic group having an aromatic ring, an alicyclic ring such as a poly-alicyclic ring, or a heterocyclic ring nearly in its center, but preferably an organic group having an aromatic ring, or an alicyclic ring such as a poly-alicyclic ring nearly in its center. More preferably, it is an organic group of any of the following formulae (II) to (VI):

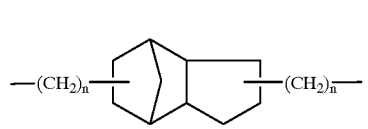
(II)

-continued

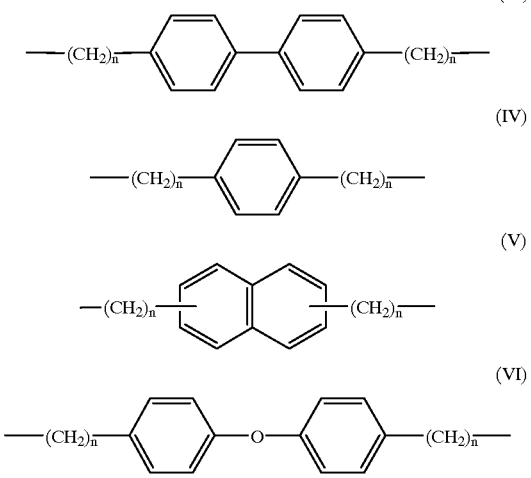

The group of formula (II) has a cyclic structure with two alkyl groups sandwiching a tricyclodecane ring therebetween; that of formula (III) has a cyclic structure with two alkyl groups sandwiching a biphenyl ring therebetween; that of formula (IV) has a cyclic structure with two alkyl groups sandwiching a benzene ring therebetween; that of formula (V) has a cyclic structure with two alkyl groups sandwiching a naphthalene ring therebetween; and that of formula (VI) has a cyclic structure with two alkyl groups sandwiching a diphenyl ether ring therebetween.

The aromatic ring to be nearly in the center of X in formula (I) includes, for example, a benzene ring, a diphenyl ring, a naphthalene ring, etc.; and the poly-alicyclic ring to be therein includes, for example, a tri-alicyclic ring, a tricyclo[5,2,1,0$^{2,6}$]decane ring, etc. These rings are preferred in view of the sanitary safety of the compounds of formula (I).

In the organic groups of formulae (II) to (VI) as above, n falls between 1 and 3, but is preferably 1. Compounds with n of 0 could not be substantially synthesized. Therefore, n in those formulae shall be inevitably 1 or more. If n is larger than 3, the monomer compounds have a high softening point and will be stable while stored. However, the compounds are unfavorable, since they require high electron beam energy for attaining the intended curing reaction, and the radiation energy dependency of the compounds in curing reaction increases. In addition, as the compounds have a high softening point, their compatibility with resins will lower. As a result, resins will be cured unevenly with them, and the resulting resin foams will have coarse and large pores.

Of those di(meth)acrylate compounds, more preferred are tricyclodecane-type di(meth)acrylate compounds of the following general formula (VII):

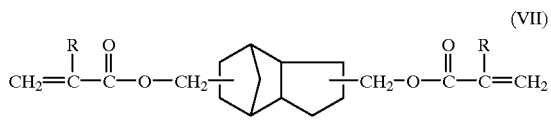

wherein R is H or CH$_3$.

In the invention, preferably used are di(meth)acrylate compounds having an aromatic ring or an alicyclic ring, for example, a poly-alicyclic ring nearly in the center of their chemical formulae, such as those mentioned hereinabove. The di(meth)acrylate compounds having such a specific structure are superior to conventional (meth)acrylate-type polyfunctional monomers having an aliphatic group in the center of their chemical formulae, in that the resins as cured with those compounds serving as curing agents could have a rigid skeleton and therefore the foams of the cured resins could have good high-temperature characteristics, that the compounds do not irritate the skin and are not toxic when taken orally, and therefore have the advantage of sanitary safety, that the compounds are not in the category of the second group petroleums as stipulated in the Fire Services Act, and therefore have the advantage of flame retardancy, that the compounds are favorably used as industrial curing agents, that the compounds have good waterprooffness, and that the energy dependency of the compounds in curing reaction is small and therefore resins can be well cured with them to give high-quality resin foams.

Apart from the di(meth)acrylate compounds mentioned hereinabove, the (meth)acrylate-type polyfunctional monomer compounds to be used herein as curing agents further include tri-functional or tetra-functional (meth)acrylic monomers having an aromatic ring, an alicyclic ring or a heterocyclic ring nearly in the center of their chemical formulae. In the following description, typically illustrated are embodiments of the invention using the di(meth)acrylate compounds of formula (I) as the curing agents.

The dipropenyl compound of formula (VIII) mentioned above is also preferably used herein as the curing agent, as having an aromatic ring nearly in the center of its chemical formula. Specifically, the compound has two propenyl groups directly bonded to the benzene ring, and it is easy to handle. In addition, the compound of p-form only is easy to prepare, and it is favorable, as acting on resins to uniformly cure them.

The amount of the di(meth)acrylate compound or the dipropenyl compound to be in the resin composition of the invention preferably falls between 1 and 10 parts by weight, more preferably between 2 and 7 parts by weight, relative to 100 parts by weight of the polyolefinic resin to be in the composition. If the amount of the compound is smaller than 1 part by weight, such is unfavorable, since the vinyl groups participating in curing the resin are insufficient and since the curing degree for the resin is difficult to design in a broad range. On the other hand, if the amount of the compound is larger than 10 parts by weight, the curing degree for the resin is easy to design in a broad range. However, using herein such a large amount of the compound is unfavorable, since the softening point of the resin composition will be lower than the temperature at which the composition is extruded in melt. If so, the plasticizer-like effect of the compound is too much in the extrusion step, whereby the melt condition of the resin composition in the extruder is seemingly poor and therefore the resin melt is difficult to extrude through the extruder. In addition, the curing points in the resin increase over the apparent curing degree of the resin, whereby the resulting resin foams could elongate poorly and the workability of the resin foams is poor.

If desired, the di(meth)acrylate compound for use herein, which is generally liquid at room temperature, may be adsorbed onto a powdery carrier having a porous structure, and the thus-adsorbed compound is easy to handle as being in powder. The powdery porous carrier includes, for example, powdery inorganic substances such as fine silica gel powder, white carbon, etc.; as well as acryl-vinyl chloride copolymer powder, granular polyethylene powder, granular polypropylene powder, etc. However, these are not limitative.

Where the di(meth)acrylate compound for use herein is adsorbed onto such a powdery porous carrier, it is desirable that the powdery porous carrier is heated up to around its softening point and the compound is adsorbed onto the thus-heated carrier. The amount of the di(meth)acrylate compound to be adsorbed onto the carrier varies, depending on the adsorbability of the carrier, but preferably falls between 10 and 80% by weight, more preferably between 30 and 70% by weight of the carrier. If the amount of the compound adsorbed is smaller than 10% by weight, a large amount of the carrier that carries the compound thereon must be in the resin composition so as to attain a high curing degree of the resin. If so, the physical properties of the foams from the resin composition that contains such a large amount of the carrier will be thereby worsened. Concretely, the elongation and the shapability of the resin foams will be worsened. On the other hand, if the amount of the compound adsorbed is larger than 80% by weight, the carrier will not have any negative influence on the physical properties of the resin foams. However, the carrier carrying the compound thereon will be blocked while stored, is therefore difficult to handle.

The curing agent may be added to a polyolefinic resin in any stage before the resin is shaped into sheets. For example, it may be added to and mixed with the resin at the same time when a chemical foaming agent is added thereto. Alternatively, after a chemical foaming agent has been added to the resin, the curing agent may be added to and mixed with it in any desired stage.

The pyrolyzable chemical foaming agent for use in the invention includes, for example, azodicarbonamides, azodicarboxylates, metal salts of azodicarboxylic acids, tetrazole compounds, N,N'-dinitrosopentamethylenetetramine, oxalic acid hydrazide, hydrazocarboxylates, etc. One or more of these are used as the foaming agent. If desired, the foaming agent may be used along with zinc compounds, amine compounds and the like having the ability to control the foaming degree of cured resins. The amount of the pyrolyzable chemical foaming agent to be in the resin composition of the invention preferably falls between 1 and 20 parts by weight, more preferably between 2 and 15 parts by weight, even more preferably between 3 and 13 parts by weight, relative to 100 parts by weight of the polyolefinic resin in the composition. If the amount of the foaming agent in the composition is small, the shapability, the heat resistance and the pressure resistance of the foams from the composition will be good as the expansion ratio thereof is small. However, adding such a small amount of the foaming agent to the composition is unfavorable, since the foams are hard and have poor buffering ability. On the other hand, if the amount of the foaming agent is too large, the cured resin will be foamed too much. Much foamed resins could have good flexibility and good buffering ability, but are unfavorable since their pressure resistance is low and, as a result, their shapability is not good.

The curable and foamable polyolefinic resin composition of the invention may optionally contain an antioxidant of typically hindered phenols and thio compounds, as well as a working stabilizer, a flame retardant, an inorganic filler, a pigment and any other additives. The optional additives will help the resin foams to have desired physical properties.

The polyolefinic resin composition of the invention is directed to resin foams to be produced in a curing and foaming method where the composition is shaped, then cured and thereafter foamed. Concretely, the composition is shaped into sheets through melt extrusion, and then the resin sheets are cured. To cure them, the resin sheets are exposed to ionizing radiations or ultraviolet rays. Preferably, they are exposed to electron beams with industrial advantage. The radiation energy for curing may fall between 0.2 and 20 Mrad, but is preferably at most 10 Mrad. The curing degree, or that is, the gel fraction of the resin as cured with the radiation energy preferably falls between 10 and 70%. For polypropylenic resin foams, however, it preferably falls between 30 and 70%. If the curing degree is too low, the resin foams will have poor pressure resistance at high temperatures, and therefore could not be well shaped under pressure. If the curing degree is higher than 70%, the resin foams could have good pressure resistance, but are hard. If so, their impact resistance at low temperatures is low, and they easily crack.

The cured resin sheets are thereafter foamed in various foaming methods. Concretely, they may be foamed in a method where they are exposed to hot air in a horizontal (or vertical) reactor, or in a method where they are processed in a chemical bath. Preferred is the latter method, as the resin foams produced could have well-balanced physical properties both in the machine direction (MD) and in the transverse direction (TD) of the sheets.

The cured foams of polyolefinic resin of the invention thus produced in the manner mentioned above are characterized in that their melt viscosity change or depression as measured through regional dynamic viscoelastometry at 1 Hz at temperatures falling between 140° C. and 210° C. is at most 500 poises/10° C. on average, and that their melt viscosity at 180° C. falls between 5,000 and 300,000 poises. If the average of their melt viscosity change or depression is larger than 500 poises/10° C., the viscosity of the foams will greatly lower with the increase in the ambient temperature. If so, the foams will greatly draw down under heat while they are shaped in vacuum, with the result that the shaped articles of the foams will be much wrinkled or waved. Anyhow, the shapability of the foams in that condition is poor. On the other hand, when the foams are shaped into articles through stamping, hot resin above 200° C. is directly contacted with the foams being shaped under pressure. In such stamping operation, the foams not satisfying the melt viscosity depression limit as above could not resist the hot resin flow, and their surfaces will be damaged. As a result, the articles as stamped out from the foams will have scratched or roughened surfaces. As so mentioned above, the resin foams of the invention have a melt viscosity at 180° C. of from 5,000 to 300,000 poises. For these, it is desirable that the constitution of the resin and also the curing degree thereof are suitably designed and controlled so as to satisfy the defined range. For example, the resin foams having a melt viscosity falling between 5,000 and 50,000 poises are favorable to thermal shaping such as vacuum shaping. For these, it is desirable that the curing degree of the resins falls between 30 and 50% or so. On the other hand, the resin foams having a melt viscosity falling between 100,000 and 300,000 are favorable to stamping, as they are resistant to the temperature and pressure changes in the resin melt in stamping. For these, it is desirable that the curing degree of the resins falls between 40 and 65% or so.

The resin foams of the invention are further characterized in that the ratio of their elongation at 150° C. to that at room temperature falls between 0.3 and 3. If the ratio of the elongation at 150° C. to that at room temperature oversteps the range between 0.3 and 3, the resin foams could not be well shaped in a broad temperature range. For example, when the ratio is larger than 3, the resin foams could well elongate at high temperatures, but often draw down while shaped. As a result, the shapability of the resin foams is poor, and, in addition, the resin foams being shaped could not maintain their original morphology. If the ratio is smaller than 0.3, the resin foams do no draw down at high temperature and could well maintain their original morphology while shaped. However, the resin foams could not be well shaped into complicated articles. More preferably, the ratio falls between 0.5 and 1.5.

The resin foams of the invention are further characterized in that the difference, R, between the largest value and the smallest value of the curing degrees that vary in their thickness direction is at most 10%. In general, the curing degree distribution in the thickness direction of resin foams depends on the type of the curing agent used, on the condition of the curing agent dispersed in resin compositions to be cured and foamed, and on the energy distribution of electron beams or ultraviolet rays applied to the resin compositions being cured. The curing degree distribution of resin foams may have two patterns. One pattern is such that the both surface layers have a high curing degree and the inner layer has a low curing degree; and the other is such that the both surface layers have a low curing degree and the inner layer has a high curing degree. Resin foams having any of these two curing degree distribution patterns are unfavorable, since their characteristics are not even but vary in their thickness direction. The resin foams of the invention are such that the difference between the largest value and the smallest value of the curing degrees that vary in their thickness direction is at most 10%, but preferably at most 5%. If the resin foams have a curing degree distribution difference of larger than 10% in any of the two distribution patterns as above, and when they receive shear while shaped, the shear stress is concentrated around the critical zone of the curing degree distribution pattern in them, whereby they are broken or unevenly elongated and the shaped articles from them will have residual strain therein. If so, the shaped articles will be deformed or have scratched or roughened surfaces.

Hereinunder mentioned is one embodiment of producing the curable and foamable polypropylenic resin composition of the invention and of curing and foaming it into foam sheets.

Prepared are a powdery polypropylenic resin (a) as produced through random copolymerization of propylene with ethylene and having MFR of from 0.5 to 5 g/10 min; a powdery polyethylenic resin (b) as produced through copolymerization of ethylene with a $C_{4-8}$ α-olefin and having MFR of from 1 to 20 g/10 min; Irganox 1010 serving as a stabilizer; azodicarbonamide serving as a foaming agent; and a dimethacrylate compound of formula (I) where R is $CH_3$, and X is an organic group of formula (II) with n=1, serving as a curing agent. The polypropylenic resin, the polyethylenic resin, the foaming agent and the stabilizer are put into a Henschel mixer in a predetermined ratio, and mixed therein at a low-speed revolution of from 200 to 400 rpm and then at a high-speed revolution of from 800 to 1000 rpm. While they are thus mixed in the mixer at the high-speed revolution, the dimethacrylate compound is added thereto, and further mixed to give a foaming resin composition.

The foaming resin composition is led into a vent-having extruder heated at a temperature at which the foaming agent is not decomposed, for example, at a temperature falling between 160 and 190° C. or so, and extruded out through its T-die into a sheet. The sheet has a thickness of from 0.7 to 4.8 mm or so, and this is cured and foamed in subsequent steps. The sheet is cured through exposure to electron beams of from 0.5 to 20 Mrad or so, then continuously led into a chemical-bath foaming apparatus set at a temperature higher by from 20 to 50° C. than the decomposition point of the foaming agent, or into a vertical, hot-air foaming apparatus set at a temperature higher by from 20 to 100° C. than the decomposition point of the foaming agent, and foamed therein under heat. The resulting long sheet foam is wound up. The sheet foam has a thickness of from 1.0 to 10 mm or so, a curing degree of from 30 to 70%, a difference, R, between the largest value and the smallest value of the curing degrees that vary in its thickness direction of smaller than 10%, and an expansion ratio of from 5 to 30 times or so.

The cured foam of polypropylenic resin of the invention is from a resin composition containing, as the curing agent, a specific compound which is hardly influenced by the energy intensity distribution of ionizing radiations to be applied to the composition. Therefore, the cured foam has a good quality especially in that its quality fluctuates little in its thickness direction, while having the advantages of heat resistance, workability and shapability, pressure resistance, elongation and flexibility. In particular, it is favorably worked and shaped at high temperatures and even under high pressure (for stamping, injection molding).

The cured foam of polyethylenic resin of the invention also has the advantages of heat resistance, workability and shapability, elongation and flexibility. Therefore, owing to its good properties of heat resistance, heat insulation, mechanical strength and flexibility, the cured foam is suitable to adhesive tapes. Owing to its good heat resistance,the cured foam is suitable to buffers and pipe covers for car upholstery. In addition, the cured foam is suitable to packages to be in freezers and freezing storehouses.

Moreover, since the curing agent to be in the resin composition of the invention has the advantage of sanitary safety, the composition is safe from any insanitary danger in the process of curing and foaming it into foams. Evaluation Methods and Evaluation Standards:

Evaluation methods and evaluation standards employed herein are mentioned below.

(1) Curing Degree (Gel Fraction)

A foam sample is cut into pieces. Just 0.2 g of the pieces are subjected to Soxhlet extraction with a solvent of tetralin at 145° C. for 3 hours. Through the extraction, the insoluble component of the sample is taken out. Then, this is cooled, washed with acetone, and heated in a vacuum drier at 800C for 1 hour whereby the volatile matter is completely removed from it. This is then spontaneously cooled at room temperature. The weight, $W_1$ g, of the thus-cooled insoluble component is measured, and the curing degree (gel fraction) of the sample is obtained according to the following equation:

$$\text{Curing Degree (gel fraction)} = (W_1/0.2) \times 100(\%)$$

(2) Difference, R, Between the Largest Value and the Smallest Value of the Curing Degrees Varying in the Thickness Direction of Foam A foam sample is sliced in the direction perpendicular to its thickness direction into pieces each having a thickness of 0.5 mm, and the curing degree of each piece is measured according to the method of (1) as above. The curing degrees thus measured are plotted relative to the thickness direction of the sample, and the largest value and the smallest value of the varying curing degrees are obtained from the plotted pattern. The difference, R, between the largest value and the smallest value is obtained according to the following equation. Samples with $R \leq 10\%$ are good.

$$R = (\text{largest value of curing degree}) - (\text{smallest value of curing degree})(\%)$$

(3) Shapability

A foam sheet sample is shaped under heat in a vacuum shaping machine to be equipped with different cup molds. Each cup mold has a predetermined ratio, L/D, where D indicates the diameter of the mold and L indicates the depth thereof. The largest ratio, L/D, of the cup mold in which the sample is shaped into a cup without being broken is obtained. Precisely, the sample is first shaped in different cup molds, of which the ratio L/D varies at intervals of 0.2 up to 1.0, and the depth of the cup mold in which the sample being shaped is broken is measured. Next, around the thus-measured depth, other different cup molds are prepared, of which the ratio L/D varies at intervals of 0.02 up to 0.1. The same sample is again shaped in those cup molds, and its shapability is determined in detail. Samples for which the L/D is at least 0.5 are good.

(4) Mechanical Strength, Elongation

Measured according to JIS-K-6767.

Samples having a mechanical strength of at least [expansion ratio×(−1.5)+45] kg/cm$^2$, and those having an elongation of at least 250% are good.

(5) Ratio of High-Temperature Elongation to Room-Temperature Elongation

Using a No. 2 dumbbell stamper, sample pieces are stamped out from a foam sheet, of which the thickness is previously measured, in the MD direction of the sheet. Using a Tensilon tensile tester equipped with an SS characteristic recorder, the room-temperature elongation and the high-temperature elongation of each test piece were measured under the conditions mentioned below, and the ratio of the high-temperature elongation to the room-temperature elongation of the sample is calculated according to the equation mentioned below.

Conditions for Measurement:

Chucking distance: 40 mm.

Elastic stress rate: 500 mm/min.

Room-temperature elongation: Measured at 23° C. and 65% RH.

High-temperature elongation: The sample piece is put in a hot box heated at 150° C. and left therein for 5 minutes, and its elongation is measured.

Ratio of high-temperature elongation to room-temperature elongation=(high-temperature elongation)/(room temperature elongation).

(6) Heat Resistance (Dimension Change Under Heat)

Sample pieces each having a size of 15×15 cm are cut out of a foam sheet. Reference lines are marked on each sample piece at intervals of 10 cm in both the machine direction (MD) and the transverse direction (TD) of the sheet, and the thickness (T mm) of each sample piece is measured. These sample pieces are put on a heat-resistant plate, on which calcium carbonate has been previously scattered. In that condition, the sample pieces on the plate are put into a hot air oven heated at 120° C., then heated therein for 2 hours, taken out of it, and spontaneously cooled at room temperature. After thus processed, the distance between the reference lines (MDx mm, TDx mm) on each sample piece, and the thickness (Tx mm) of each sample piece are measured. The dimension change in each sample is calculated according to the following equations:

Dimension change in $MD=[(100-MDx)/100]\times 100(\%)$

Dimension change in $TD=[(100-TDx)/100]\times 100(\%)$

Dimension change in thickness direction=$[(T-Tx)/T]\times 100(\%)$

Samples with a dimension change in MD and a dimension change in TD of ±4% each, and those with a dimension change in the thickness direction of ±5% are good.

(7) Melt Viscosity

A regional viscoelastometer (from Rheology), MR-500 Soliquid Meter is used. A sample is sandwiched between parallel discs of the holder in the device. With the compression relative to the thickness of the sample being kept constant, one disc is vibrated at a frequency of 1 Hz, and the modulus of rigidity, the viscosity index and tan δ of the sample are measured based on the torque and the phase difference in the other disc. The temperature is varied from 150° C. up to 230° C. at intervals of 10° C. From the viscosity index, derived is the melt viscosity of the sample according to the Cox-Merz empirical rule. The data of melt viscosity versus temperature are plotted, and the melt viscosity depression at intervals of 10° C. is read in the plotted pattern. The thus-read data are averaged to obtain the mean melt viscosity depression. The melt viscosity of the sample at 180° C. is recorded.

(8) Melting Point

Using a differential scanning calorimeter (DSC III Model from Perkin Elmer), a sample is measured for its melting heat absorption spectrum. The temperature at which the spectral pattern gives the highest peak is the melting point of the sample.

(9) Melt Flow Rate (MFR)

MFR of polypropylenic resin is measured according to JIS-K-6758, while that of polyethylenic resin is according to JIS-K-6760.

(10) Density

The density of polyethylenic resin is measured according to JIS-K-6760.

The invention is described in more detail with reference to the following Examples, which, however, are not intended to restrict the scope of the invention.

EXAMPLE 1

Prepared were a powdery polypropylenic resin (a) as produced through random copolymerization of propylene with 3.6% by weight of ethylene and having a melting point of 142° C. and MFR of 2.5 g/10 min; a powdery polyethylenic resin (b) as produced through copolymerization of ethylene with 5% by weight of butene and having a density of 0.925 g/cm$^3$, MFR of 5.0 g/10 min and a melting point of 125° C.; azodicarbonamide serving as a foaming agent; a hindered phenol compound, Irganox 1010 serving as a stabilizer; and a dimethacrylate compound of formula (I) where R is CH$_3$, and X is an organic group of formula (II) with n=1, serving as a curing agent.

96 kg of the polypropylenic resin (a), 64 kg of the polyethylenic resin (b), 7.4 kg of the foaming agent, and 0.95 kg of the stabilizer were put into a Henschel mixer having an effective capacity of 750 liters, and mixed therein at a low-speed revolution of from 200 to 400 rpm for about 3 minutes, and then at a high-speed revolution of from 800 to 1000 rpm for further 3 minutes. Then, after the temperature of the resulting powder mixture in the Henschel mixer reached 65° C., 3.2 kg of the dimethacrylate compound was fed into the mixer, and further mixed therein for 3 minutes to give a foaming resin composition.

The foaming resin composition was led into a vent-having extruder heated at a temperature falling between 170 and 190° C., at which the foaming agent is not decomposed, and extruded out through its T-die into a sheet. The sheet to be cured and foamed in subsequent steps had a thickness of 1.2 mm and a width of 560 mm. The sheet was cured through exposure to electron beams of 3.2 Mrad, then continuously led into a chemical-bath foaming apparatus set at a temperature higher by 30° C. than the decomposition point of the foaming agent, and foamed therein under heat. The resulting long sheet foam was wound up.

As in Table 3 below, the sheet foam had a thickness of 2.5 mm, a width of 1350 mm, a curing degree (gel fraction) of 50%, a difference, R, between the largest value and the smallest value of the curing degrees varying in its thickness direction of 3%, and an expansion ratio of 15 times.

EXAMPLES 2 to 4

Resin compositions were prepared and these were cured and foamed into sheet foams all in the same manner as in Example 1, except that the polypropylenic resin (a), the polyethylenic resin (b) and the curing agent, and their ratios were varied as in Table 1 below, and that the condition for curing and foaming the compositions was varied as in Table 2. The characteristics of the sheet foams produced are in Table 3.

EXAMPLE 5

30% by weight of the dimethacrylate compound as prepared in Example 1 was adsorbed onto powdery granules of ultra-low-density polyethylene having a density of 0.905 g/cm$^3$ and MFR of 3.2 g/10 min, to prepare powdery, dimethacrylate compound-adsorbed polyethylene granules.

Using the powdery granules, as a curing agent, in an amount of 4.0 kg in terms of the dimethacrylate compound therein, a resin composition was prepared, cured and foamed into a sheet foam in the same manner as in Example 1, except that the polypropylenic resin (a) and the polyethylenic resin (b), and their ratio were varied as in Table 1, and that the condition for curing and foaming the composition was varied as in Table 2. The characteristics of the sheet foam produced are in Table 3.

TABLE 2

| | Thickness and Width of Sheet, before cured and foamed | Dose of Electron Beams for Curing (Mrad) |
|---|---|---|
| Example 1 | thickness: 1.2 mm<br>width: 560 mm | 3.2 |
| Example 2 | thickness: 1.45 mm<br>width: 620 mm | 4.7 |
| Example 3 | thickness: 1.75 mm<br>width: 640 mm | 6.2 |
| Example 4 | thickness: 1.2 mm<br>width: 540 mm | 5.3 |
| Example 5 | thickness: 0.97 mm<br>width: 590 mm | 8.1 |

TABLE 1

| | Polypropylenic Resin (a) | Polyethylenic Resin (b) | Dimethacrylate Compound (c) serving as curing agent | Formulation Ratio (kg) |
|---|---|---|---|---|
| Example 1 | 3.6% ethylene random copolymer<br>MFR: 2.5 g/10 min<br>m.p.: 142° C. | 5% butene copolymer<br>density: 0.925 g/cm$^3$<br>MFR: 5.0 g/10 min<br>m.p.: 125° C. | X: formula (II) with n = 1<br>R: CH$_3$ | a:96<br>b:64<br>c:3.2<br>d:7.4 |
| Example 2 | 4.7% ethylene random copolymer<br>MFR: 0.8 g/10 min<br>m.p.: 140° C. | 6.9% 4-methylpentene-1 copolymer<br>density: 0.900 g/cm$^3$<br>MFR: 2.3 g/10 min<br>m.p.: 116° C. | X: formula (IV) with n = 1<br>R: CH$_3$ | a:112<br>b:48<br>c:4.0<br>d:1.2 |
| Example 3 | 4.0% ethylene random copolymer<br>MFR: 1.3 g/10 min<br>m.p.: 143° C. | 5.4% octene copolymer<br>density: 0.905 g/cm$^3$<br>MFR: 7.0 g/10 min<br>m.p.: 121° C. | X: formula (III) with n = 1<br>R: CH$_3$ | a:128<br>b:32<br>c:5.6<br>d:6.8 |
| Example 4 | 3.6% ethylene random copolymer<br>MFR: 1.3 g/10 min<br>m.p.: 143° C. | 9.8% butene copolymer<br>density: 0.905 g/cm$^3$<br>MFR: 5.0 g/10 min<br>m.p.: 121° C. | X: formula (V) with n = 1<br>R: CH$_3$ | a:96<br>b:64<br>c:4.0<br>d:4.5 |
| Example 5 | 4.0% ethylene random copolymer<br>MFR: 1.3 g/10 min<br>m.p.: 143° C. | 9.8% butene copolymer<br>density: 0.905 g/cm$^3$<br>MFR: 5.0 g/10 min<br>m.p.: 121° C. | X: formula (II) with n = 1<br>R: CH$_3$<br>(adsorbed on powdery grains) | a:96<br>b:64<br>c:4.0<br>d:7.4 |

Note:
In formulation ratios, a, b, c and d each indicate polypropylenic resin (a), polyethylenic resin (b), dimethacrylate compound, and azodicarbonamide, respectively.

TABLE 3

|  | Curing Degree (%) | Curing Degree Fluctuation, R(%) | Shapability (L/D) | Mechanical Strength, (kg/cm$^2$) | Elongation (%) | Ratio of High-temperature elongation/-Room-temperature elongation |
|---|---|---|---|---|---|---|
| Example 1 | 50 | 3 | 0.72 | 14.1 | 340 | 1.5 |
| Example 2 | 42 | 6 | 0.80 | 12.9 | 410 | 1.9 |
| Example 3 | 52 | 7 | 0.65 | 13.8 | 320 | 1.3 |
| Example 4 | 57 | 3 | 0.55 | 14.9 | 270 | 0.8 |
| Example 5 | 48 | 4 | 0.70 | 10.9 | 300 | 1.5 |

|  | Melt Viscosity, × 10$^4$ (poises) | Mean Melt Viscosity Depression (poises/° C.) | Dimension Change under Heat (%) | | | Expansion Ratio (times) |
|---|---|---|---|---|---|---|
|  |  |  | MD | TD | ZD |  |
| Example 1 | 2.5 | 210 | −1.8 | −0.9 | +2.1 | 15 |
| Example 2 | 0.9 | 360 | −1.1 | −0.5 | +1.5 | 18 |
| Example 3 | 3.5 | 270 | −2.2 | −1.1 | +2.9 | 13 |
| Example 4 | 17.5 | 170 | −2.8 | −1.9 | +3.6 | 15 |
| Example 5 | 5.3 | 230 | −1.7 | −1.4 | +2.5 | 20 |

Note:
ZD indicates the thickness direction of sheet.

As in Examples 1 to 5, the resin compositions and their foams of the invention all had good heat resistance, good shapability, good elongation and good flexibility. In particular, they were suitable to high-temperature high-pressure shaping (for stamping, injection molding).

COMPARATIVE EXAMPLE 1

A resin composition was prepared, cured and foamed into a sheet foam in the same manner as in Example 1, except that the polypropylenic resin (a), the polyethylenic resin (b) and the curing agent, and their ratio were varied as in Table 4 below, and that the condition for curing and foaming the composition was varied as in Table 4 below. The characteristics of the sheet foam produced are in Table 6 below.

COMPARATIVE EXAMPLES 2 to 5

Resin compositions were prepared and these were cured and foamed into sheet foams all in the same manner as in Example 1, except that the curing agent and its amount and also the formulation ratios of the constituent components were varied as in Table 5 below. The characteristics of the sheet foams produced are in Table 6. In Comparative Example 4, the curing insufficiency resulted in the foaming insufficiency. In Comparative Example 5, bubbles passed through the surface layer thereby causing the foaming insufficiency.

TABLE 4

|  | Poly-proplylenic Resin (a) | Poly-ethylenic Resin (b) | Curing Agent (c) | Formulation Ratio (kg) | Foaming Agent (kg) | Width and Thickness of Sheet, before cured and foamed | Dose of Electron Beams (Mrad) |
|---|---|---|---|---|---|---|---|
| Comparative Example 1 | 4.3% ethylene random copolymer MFR: 2.5 g/10 min m.p.: 139° C. | 5.6% butene copolymer density: 0.920 g/cm$^3$ MFR: 3.4 g/10 min m.p.: 123° C. | 1,9-nonane diacrylate (X: alkyl with n = 9) | a: 80 b: 80 c: 2.0 d: 0.3 | azodicarbon-amide 9.2 | thickness: 1.75 mm width: 480 mm | 9.4 |

Note:
In formulation ratio, a, b, c and d each indicate polypropylenic resin (a), polyethylenic resin (b), curing agent, and stabilizer, respectively.

TABLE 5

|  | Curing Agent (c) | Formulation Ratio (kg) | Foaming Agent (kg) | Width and Thickness of Sheet, before cured and foamed | Dose of Electron Beams (Mrad) |
|---|---|---|---|---|---|
| Comparative Example 2 | 1,6-hexane dimethacrylate (X: alkyl with n = 6) | a: 48 b: 112 | azodicarbonamide, 7.8 | thickness: 2.00 mm width: 560 mm | 7.3 |

TABLE 5-continued

|  | Curing Agent (c) | Formulation Ratio (kg) | Foaming Agent (kg) | Width and Thickness of Sheet, before cured and foamed | Dose of Electron Beams (Mrad) |
|---|---|---|---|---|---|
| Comparative Example 3 | divinylbenzene (DVB) | a: 112<br>b: 48<br>c: 8 | azodicarbonamide, 11.5 | thickness: 1.5 mm<br>width: 430 mm | 6.9 |
| Comparative Example 4 | pentaerythritol triacrylate | a: 112<br>b: 48<br>c: 5.6 | azodicarbonamide, 5.9 | thickness: 2.1 mm<br>width: 600 mm | 4.5 |
| Comparative Example 5 | diallyl phthalate | a: 160<br>b: 0<br>c: 6.4 | azodicarbonamide, 7.8 | thickness: 1.7 mm<br>width: 550 mm | 11.6 |

Note:
In formulation ratio, a, b, c and d each indicate polypropylenic resin, polyethylenic resin, curing agent, and stabilizer, respectively.

TABLE 6

|  | Curing Degree (%) | Curing Degree Fluctuation, R(%) | Shapability (L/D) | Mechanical Strength, (kg/cm$^2$) | Elongation (%) | Ratio of High-temperature elongation/-Room-temperature elongation |
|---|---|---|---|---|---|---|
| Comparative Example 1 | 42 | 8.4 | 0.65 | 10.9 | 310 | 3.9 |
| Comparative Example 2 | 47 | 9.9 | 0.40 | 12.2 | 240 | 0.25 |
| Comparative Example 3 | 69 | 15 | 0.35 | 12.7 | 200 | 0.20 |
| Comparative Example 4 | 17 | 21 | 0.9 | 16.5 | 220 | 4.8 |
| Comparative Example 5 | 24 | 26 | 0.3 | 15.1 | 160 | 6.5 |

|  | Melt Viscosity, × 10$^4$ (poises) | Mean Melt Viscosity Depression (poises/° C.) | Dimension Change under Heat (%) | | | Expansion Ratio (times) |
|---|---|---|---|---|---|---|
|  |  |  | MD | TD | ZD |  |
| Comparative Example 1 | 0.42 | 690 | −1.7 | −1.3 | +3.9 | 20 |
| Comparative Example 2 | 18.0 | 490 | −4.7 | −3.9 | +5.9 | 12 |
| Comparative Example 3 | 34.0 | 270 | −4.7 | −3.9 | +5.9 | 25 |
| Comparative Example 4 | 0.39 | 940 | −0.8 | −0.9 | +1.2 | 7 |
| Comparative Example 5 | 0.73 | 1120 | −2.0 | −2.5 | −1.5 | 10 |

Note:
ZD indicates the thickness direction of sheet.

As in Comparative Examples 1 to 5, the cured foams from resin compositions in which the curing agent was not the specific compound as defined herein were all not good, as they were defective in any of elongation, shapability and heat resistance.

EXAMPLE 6

Prepared were a butene-copolymerized, ultra-low-density polyethylenic resin (c), Nippon Unicar's NUC9078NT7, having MFR of 2 g/10 min, a density of 0.910 g/cm$^3$ and a melting point of 121° C.; a butene-copolymerized, linear low-density polyethylenic resin (d) having MER of 5 g/10 min, a density of 0.920 g/cm$^3$ and a melting point of 123° C.; 0.55 kg of Irganox 1010 serving as a stabilizer; 6.1 kg of azodicarbonamide serving as a foaming agent; and p,p'-diphenyldiol dimethacrylate serving as a curing agent (c).

70 kg of the ultra-low-density polyethylenic resin (c), 30 kg of the linear low-density polyethylenic resin (d), 0.55 kg of the stabilizer and 6.1 kg of the foaming agent were put into a Henschel mixer having an effective capacity of 500 liters, and mixed therein at a low-speed revolution of from 200 to 400 rpm for about 3 minutes to give a foaming resin composition. The mixing operation was repeated three times, and the resulting mixture was kept in an intermediate hopper.

The foaming resin composition was led into a vent-having extruder heated at a temperature falling between 120 and 160° C., at which the foaming agent is not decomposed. The extruder was so designed that the extrusion rate through it could be 100 kg/hr. Simultaneously with the resin introduction, 2.0 kg of the dimethacrylate compound was fed into the extruder via a metering device equipped with a gear pump, at a flow rate of 2 kg/hr. In that condition, the resin composition was extruded out through the T-die into a sheet. The sheet to be cured and foamed in the subsequent steps had a thickness of 1.0 mm and a width of 680 mm. The sheet was cured through exposure to electron beams of 5.0 Mrad, then continuously led into a chemical-bath foaming apparatus set at a temperature higher by 20° C. than the decomposition point of the foaming agent, and foamed therein under heat. The resulting long sheet foam was wound up.

The sheet foam of polyethylenic resin had a thickness of 2.0 mm, a width of 1450 mm, a curing degree of 40%, and an expansion ratio of 15 times. The properties of the sheet foam are shown in Table 7 below. As in Table 7, the sheet foam had good heat resistance, good shapability, good elongation and good flexibility.

COMPARATIVE EXAMPLE 6

A resin composition was prepared, cured and foamed in the same manner as in Example 6, except that the resin components and their formulation ratio and also the curing condition were varied as in Table 7. The properties of the sheet foam produced are in Table 7. As in Table 7, the sheet foam was defective in any of elongation, shapability and heat resistance.

with 3.6% by weight of ethylene and having a melting point of 142° C. and MFR of 2.5 g/10 min; a powdery polyethylenic resin (b) as produced through copolymerization of ethylene with 5.2% by weight of butene and having MFR of 5 g/10 min and a melting point of 125° C.; azodicarbonamide serving as a foaming agent; Irganox 1010 serving as a stabilizer; and p,p'-dipropenylbenzene (3.2 kg).

96 kg of the polypropylenic resin (a), 64 kg of the polyethylenic resin (b), 7.4 kg of the foaming agent, and 0.95 kg of the stabilizer were put into a Henschel mixer having an effective capacity of 750 liters, and mixed therein at a low-speed revolution of from 200 to 400 rpm for about 3 minutes, and then at a high-speed revolution of from 800 to 1000 rpm with the dipropenylenzene compound being fed into the mixer during the high-speed mixing operation. After the compound was all fed into the mixer, the mixture was stirred further at the high-speed revolution for additional 3 minutes. Then, after the temperature of the resulting mixture in the mixer reached 50° C., the mixture was taken out. This mixture is a foaming resin composition.

The foaming resin composition was led into a vent-having extruder heated at a temperature falling between 170 and 190° C., at which the foaming agent is not decomposed, and extruded out through its T-die into a sheet. The sheet to be cured and foamed subsequent steps had a thickness of 1.2 mm and a width of 560 mm. The sheet was cured through exposure to electron beams of 3.2 Mrad, then continuously led into a vertical, hot-air foaming apparatus set at a temperature higher by 30° C. than the decomposition point of the foaming agent, and foamed therein under heat. The resulting long sheet foam was wound up.

The sheet foam had a thickness of 2.5 mm, a width of 1350 mm, a curing degree of 50%, a difference between the largest value and the smallest value of the curing degrees varying in its thickness direction of 0.8%, and an expansion ratio of 15 times. The properties of the sheet foam are shown in Table 8 below. As in Table 8, the sheet foam had good shapability, good elongation and good heat resistance.

TABLE 7

|  | Ultra-low-density Polyethylene (a) | Linear Low-density Polyethylene (b) | Formulation Ratio, a/b/c | Foaming Agent (kg) | Curing Agent (c) | Thickness and Width of Sheet, before cured and foamed | Dose of Electron Beams (Mrad) |
|---|---|---|---|---|---|---|---|
| Example 6 | butene copolymer density: 0.910 g/cm³ MFR: 2.0 g/10 min m.p.: 121° C. | butene copolymer density: 0.920 g/cm³ MFR: 6.0 g/10 min m.p.: 125° C. | a: 70 b: 30 c: 2 | azodicarbonamide, 6.1 | p,p'-diphenyldiol dimethacryl-ate | thickness: 1.0 mm width: 680 mm | 5 |
| Comparative Example 6 | density: 0.900 g/cm³ MFR: 2.5 g/10 min m.p.: 139° C. | butene copolymer density: 0.925 g/cm³ MFR: 3.4 g/10 min m.p.: 123° C. | a: 90 b: 10 c: 4 | azodicarbonamide, 9,2 | divinyl-benzene | thickness: 1.5 mm width: 550 mm | 8.5 |

|  | Curing Degree (%) | Exapansion Ratio (times) | Shapability | Mechanical Strength (kg/cm²) | Elongation (%) | Dimension Change under Heat (%) | | |
|---|---|---|---|---|---|---|---|---|
|  |  |  |  |  |  | MD | TD | ZD |
| Example 6 | 40 | 15 | 0.72 | 14.1 | 340 | −2.9 | −2.0 | +4.7 |
| Compara. Example 6 | 15 | 13 | 0.45 | 6.3 | 200 | −6.1 | −5.6 | +9.4 |

EXAMPLE 7

Prepared were a powdery polypropylenic resin (a) as produced through random copolymerization of propylene

TABLE 8

| | Poly-propylenic Resin (a) | Poly-ethylenic Resin (b) | Curing Agent (c) | Formulation Ratio (kg) | Foaming Agent (kg) | Thickness and Width of Sheet | Dose of Electron Beams (Mrad) |
|---|---|---|---|---|---|---|---|
| Example 7 | 3.6% ethylene random copolymer MFR: 2.5 g/10 min mp,p: 142° C. | 5.2% butene copolymer density: 0.925 g/cm³ MFR: 5.0 g/10 min m.p.: 125° C. | p,p'-dipropenyl-benzene (powder) m.p.: 68° C. | a: 96 b: 64 c: 32 d: 0.95 | azodicarbon-amide, 7.4 | thickness: 1.2 mm width: 560 mm | 3.2 |

| | Curing | Mechanical | | | Dimension Change under Heat (%) | | | Expansion |
|---|---|---|---|---|---|---|---|---|
| | Degree (%) | Shapa-bility | Strength (kg/cm²) | Elongation (%) | MD | TD | ZD | Ratio (times) |
| Example 7 | 50 | 0.72 | 14.1 | 340 | −0.9 | −0.3 | +1.2 | 15 |

Note:
In formulation ratio, a,b,c and d each indicate polypropylenic resin, polyethylenic resin, curing agent, and stabilizer, respectively.

While the invention has been described in detail and with reference to specific embodiments thereof, it will be apparent to one skilled in the art that various changes and modifications can be made therein without departing from the spirit and scope thereof.

What is claimed is:

1. A curable and foamable polyolefinic resin composition comprising a polyolefinic resin, a (meth)acrylic polyfunctional monomer compound having an aromatic ring, an alicyclic ring or a heterocyclic ring nearly in the center of its chemical formula, and a pyrolyzable chemical foaming agent.

2. The curable and foamable polyolefinic resin composition as claimed in claim 1, wherein the (meth)acrylic polyfunctional monomer compound is a di(meth)acrylate compound of a general formula (I):

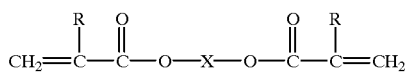
(I)

where X represents an organic group having an aromatic ring, an alicyclic ring or a heterocyclic ring nearly in its center; R represents H or $C_mH_{(2m+1)}$; and m falls between 1 and 3.

3. The curable and foamable polyolefinic resin composition as claimed in claim 2, wherein X in formula (I) representing the di(meth)acrylate compound is an organic group having an aromatic ring or an alicyclic ring in its center.

4. The curable and foamable polyolefinic resin composition as claimed in claim 2, wherein X in formula (I) representing the di(meth)acrylate compound is any one of the following formulae (II) to (VI):

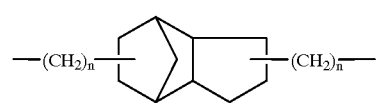
(II)

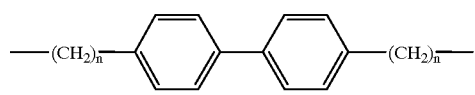
(III)

(IV)

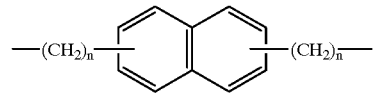
(V)

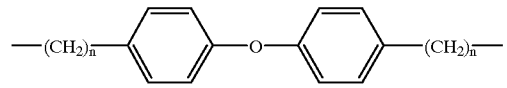
(VI)

where n falls between 1 and 3.

5. The curable and foamable polyolefinic resin composition as claimed in claim 2, wherein the di(meth)acrylate compound is represented by a general formula (VII):

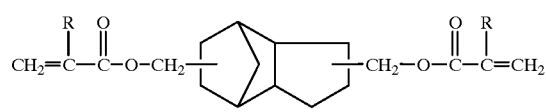
(VII)

where R is H or $CH_3$.

6. The curable and foamable polyolefinic resin composition as claimed in claim 1, wherein the amount of the (meth)acrylic polyfunctional monomer compound is from 1 to 10 parts by weight relative to 100 parts by weight of the polyolefinic resin.

7. A curable and foamable polyolefinic resin composition comprising a polyolefinic resin, a dipropenyl compound of the following formula (VIII), and a pyrolyzable chemical foaming agent:

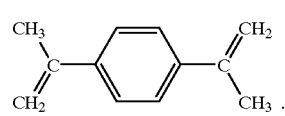
(VIII)

8. The curable and foamable polyolefinic resin composition as claimed in claim 7, wherein the amount of the dipropenyl compound is from 1 to 10 parts by weight relative to 100 parts by weight of the polyolefinic resin.

9. The curable and foamable polyolefinic resin composition as claimed in claim 1 or 7, wherein the amount of the pyrolyzable chemical foaming agent is from 1 to 20 parts by weight relative to 100 parts by weight of the polyolefinic resin.

10. The curable and foamable polyolefinic resin composition as claimed in claim 1, wherein the polyolefinic resin is a polypropylenic resin, a polyethylenic resin, or a mixture of a polypropylenic resin and a polyethylenic resin.

11. The curable and foamable polyolefinic resin composition as claimed in claim 1, wherein the polyolefinic resin is a mixture comprising from 30 to 90% by weight of a polypropylenic resin having a melt flow rate (MFR) of from 0.5 to 5 g/10 min and from 10 to 70% by weight of a polyethylenic resin having a melt flow rate (MFR) of from 1 to 20 g/10 min.

12. The curable and foamable polyolefinic resin composition as claimed in claim 1, wherein the polyolefinic resin is an ultra-low-density polyethylenic copolymer resin as copolymerized with a $C_{3-12}$ α-olefin and having a density of from 0.880 to 0.910 g/cm³ and a melt flow rate (MFR) of from 0.5 to 15 g/10 min, or a linear low-density polyethylenic resin having a density of from 0.915 to 0.935 g/cm³ and a melt flow rate (MFR) of from 1 to 20 g/10 min, or a mixed polyethylenic resin of said ultra-low-density polyethylenic copolymer resin and said linear low-density polyethylenic resin.

13. The curable and foamable polyolefinic resin composition as claimed in claim 2, wherein the di(meth)acrylate compound of formula (I) is in such a condition that from 10 to 80% by weight of the compound is adsorbed on a powdery carrier having a porous structure.

14. A polyolefinic resin composition that comprises a polyolefinic resin, a dipropenyl compound of the following formula (VIII), and a pyrolyzable chemical foaming agent, for curing and foaming it into a resin foam:

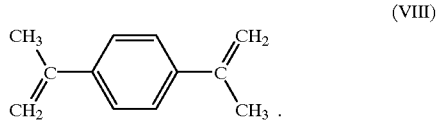
(VIII)

15. A cured foam of polyolefinic resin, as produced by shaping the curable and foamable polyolefinic resin composition of claim 1 or 7 into a sheet followed by curing and foaming the sheet, and having a curing degree of from 10 to 70%.

16. A cured foam of polyolefinic resin, as produced by shaping the curable and foamable polyolefinic resin composition of claim 11 into a sheet followed by curing and foaming the sheet, and having a curing degree of from 30 to 70%.

17. The cured foam of polyolefinic resin as claimed in claim 15, of which the melt viscosity depression as determined through regional dynamic viscoelastometry at temperatures falling between 140 and 210° C. is at most 500 poises/10° C. on average and which has a melt viscosity at 180° C. of from 5,000 to 300,000 poises.

18. The cured foam of polyolefinic resin as claimed in claim 15, which is such that the ratio of its elongation at 150° C. to that at room temperature falls between 0.3 and 3.

19. The cured foam of polyolefinic resin as claimed in claim 14, which is such that the difference, R, between the largest value and the smallest value of the curing degrees that vary in its thickness direction is at most 10%.

20. A method for producing a cured foam of polyolefinic resin, which comprises melting and shaping the foamable and curable polyolefinic resin composition of claim 1 or 7 into a sheet, then curing it through exposure to ionizing radiations and/or ultraviolet rays, and heating and foaming it under normal pressure to give a resin foam having a curing degree of from 10 to 70%.

21. A method for producing a cured foam of polyolefinic resin, which comprises melting and shaping the foamable and curable polyolefinic resin composition of claim 11 into a sheet, then curing it through exposure to ionizing radiations and/or ultraviolet rays, and heating and foaming it under normal pressure to give a resin foam having a curing degree of from 30 to 70%.

* * * * *